United States Patent Office 3,264,231
Patented August 2, 1966

3,264,231
HYDROXY(POLYALKYLENOXY)ALKYL HYDRA-
ZINE BASED POLYURETHANES
Arthur Ibbotson, Manchester, England, assignor to Imperial Chemical Industries Limited, London, England, a corporation of Great Britain
No Drawing. Filed Dec. 10, 1962, Ser. No. 243,622
Claims priority, application Great Britain, Dec. 11, 1961, 44,187/61
3 Claims. (Cl. 260—2.5)

This invention relates to improvements in or relating to the manufacture of polymeric materials, and more particularly to the manufacture of polyurethane materials.

It is known to make polyurethane materials by reacting together an organic polyisocyanate and a hydroxyl group-containing polyether made by reaction of a 1:2-alkylene oxide such as ethylene oxide or propylene oxide with a hydroxy compound for example water, ethylene glycol or glycerol.

For some purposes however, it is desirable that the reaction should proceed rapidly and the known processes are not entirely satisfactory in this respect. Thus it is commercially desirable to be able to apply the ingredients, from which a polyurethane material is to be made, in a finely divided state for example by spraying. This is a simple and economical way of producing a relatively thin layer of polyurethane foam or a polyurethane surface coating, for example on a structure of complicated shape. For such a method of application, particularly when spraying on vertical surfaces, the polyurethane ingredients must react together very rapidly so that it is generally necessary to use large quantities of compounds which behave as catalysts for the urethane-forming reaction, for example tertiary amines or metallic salts or organometallic compounds. The use of such large amounts of catalytic materials possesses disadvantages for example in that tertiary amine catalysts are on the whole malodorous and that certain metallic catalysts for example tin catalysts promote degradation of polyurethanes based on polyethers.

A rapid reaction between the polyether and the polyisocyanate in spray applications is also essential on account of the toxicity of many of the polyisocyanates used which due to their volatility would constitute a volatile toxic hazard under spraying conditions if they did not react rapidly.

So far it has proved difficult to devise polyurethane forming mixtures, which combined simplicity of operation with rapidity of reaction and resulted in satisfactory polyurethanes.

I have now found that hydroxyl-containing polyethers which contain the hydrazine grouping are very reactive towards isocyanates, although this is surprising in view of the relatively low basicity of the hydrazine group compared with the tertiary amino group, and react smoothly and rapidly with polyisocyanates to give polyurethane materials with desirable properties.

Thus according to the present invention there is provided a process for the manufacture of polyurethane materials by the interaction of an organic polyisocyanate and a hydroxyl group-containing polyether characterised in that the polyether in addition to containing at least two hydroxyl groups also contains at least one hydrazine grouping.

The hydrazine groups may be any groups comprising two linked nitrogen atoms which are otherwise linked directly only to carbon atoms.

The polyethers which in addition to containing at least two hydroxyl groups also contain a hydrazine group suitable for use in the process of the present invention include the products made by reacting hydrazine or substituted hydrazines containing at least two active hydrogen atoms with cyclic oxides for example 1:2-alkylene oxides such as ethylene oxide, propylene oxide, epichlorhydrin and butylene-1:2 and 2:3-oxides, oxacyclobutane and substituted oxacyclobutanes, and tetrahydrofuran. Thus for example there may be mentioned the polyethers made by reacting ethylene oxide or propylene oxide, or mixtures thereof, with hydrazine, mono or disubstituted hydrazines in which the substituents may be alkyl, cycloalkyl, aryl or substituted alkyl, cycloalkyl or aryl groups.

A preferred class of polyethers which may advantageously be used in the process of the present invention are those polyethers having the general formula

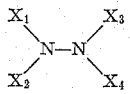

wherein $X_1$, $X_2$, $X_3$ and $X_4$ each represent a substituted or unsubstituted alkyl, cycloalkyl or aryl radical, a hydroxyalkyl radical or a hydroxy poly(alkyleneoxy) alkyl radical of the general formula

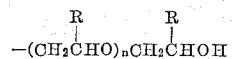

wherein $n$ represents an integer and R represents hydrogen, a lower alkyl radical, an aryl radical or a halogen- or aryl-substituted lower alkyl group, at least two of the radicals $X_1$, $X_2$, $X_3$ and $X_4$ being hydroxypoly(alkyleneoxy)alkyl radicals as above defined.

As examples of substituted or unsubstituted alkyl, cycloalkyl, aralkyl or aryl radicals which may be represented by $X_1$, $X_2$, $X_3$ or $X_4$ in the formula above there may be mentioned methyl, ethyl, n-propyl, octyl, octadecyl, cyclo-hexyl, methyl cyclo-hexyl, benzyl, β-phenyl ethyl, styryl, phenyl, tolyl, xylyl, p-chlorophenyl, p-nitrophenyl, p-aminophenyl, p-hydroxyphenyl.

As examples of hydroxyalkyl radicals which may be represented by $X_1$, $X_2$, $X_3$ or $X_4$ in the formula above there may be mentioned β-hydroxyethyl, β-hydroxy-n-propyl, β-hydroxy-n-butyl, 4-hydroxybutyl.

As examples of the radical R in the ether radical given above there may be mentioned hydrogen, methyl, chloromethyl, ethyl, phenyl, benzyl and allyl.

The preferred polyethers may be made by reaction of 1:2-alkylene oxides for example propylene oxide, butylene-1:2 and 2:3-oxides and epichlorhydrin with hydrazine or substituted hydrazines containing at least two active hydrogen atoms.

As examples of suitable hydrazines from which the preferred polyethers may be made there may be mentioned mono- and di-alkyl hydrazines, mono- and di-cycloalkyl hydrazines, mono- and di-aryl hydrazines and alkyl aryl hydrazines. There may also be used hydrazines in which there are other groups reactive towards alkylene oxides for example hydroxyl groups such as the hydroxy group in hydroxyethyl hydrazine.

It is preferred that the total amount of alkylene oxide reacted with the hydrazine or substituted hydrazine, to give the polyethers useful in the process of this invention, is in the range of 2 to 20 molecular proportions of the alkylene oxide for each reactive hydrogen in the hydrazine compound. Smaller or larger proportions may be used if desired but the use of smaller proportions generally gives compounds which react so vigorously with isocyanates that they are unsuitable as major compounds of the polyurethane system, larger proportions lead to polyethers of excessive molecular weight and low reactivity.

If so desired the hydrazine or the hydrazine derivative may be reacted with the 1:2-alkylene oxide in more than one stage, and the same or a different 1:2-alkylene oxide may be used in the various stages. Thus, for example an intermediate product such as a mono, di or tri(hydroxyethyl)hydrazine may be prepared and may be further reacted with ethylene oxide or propylene oxide. The condensation in the different stages may be to any convenient extent, and need not necessarily produce single compounds at any one stage.

The polyethers may be made by any of the methods well known in the art, they may be made by base or acid catalysed processes. For example, an aqueous or alcoholic solution of the hydrazine compound may be first reacted with a 1:2-alkylene oxide at 70°–100° C. and 5–10 lbs./sq. in. pressure until the corresponding hydroxyalkylhydrazine results, and then an alkaline catalyst such as potassium hydroxide may be added, the water or alcohol removed by distillation and more propylene oxide added at 100°–140° C. and 5–50 lbs./sq. in. pressure until a polyether of the desired molecular weight is formed.

The reactivity of these polyethers with isocyanates depends to some extent upon their hydrazine content and the molecular weight of the polyether, and a low molecular weight polyether made from a particular alkylene oxide and a hydrazine will usually be more reactive than a higher molecular weight polyether made from the same intermediates. If desired, the high reactivity of the polyethers containing hydrazine groups may be modified by using them in admixture with other polyethers or polyesters which are free from hydrazine groups. In this way it is possible to make foam-forming compositions of any desired degree of reactivity, including compositions which may be used in a batch process or in a continuous dispensing process where a longer mixing time is necessary.

Additional ingredients may be added to the polyurethane forming mixture if desired. Thus there may be incorporated in the mixture organic or inorganic pigments, fillers, flame-retarders, for example tri-($\beta$-chloroethyl) phosphate, extenders, for example tricresyl phosphate, structure modifiers such as polysiloxanes and block copolymers thereof with polyalkylene oxides, and emulsifying agents, for example soaps or ethylene oxide condensates.

As examples of organic polyisocyanates suitable for use in the process of the present invention there may be mentioned tolylene-2:4-diisocyanate, mixtures of tolylene-2:4- and -2:6-diisocyanates, diphenylmethane diisocyanates, 4:4′-diisocyanato-3-methyldiphenylmethane, m- and p-phenylene diisocyanates, chlorophenylene-2:4-diisocyanate, and mixtures thereof. Triisocyanates and higher polyisocyanate may be used alone or in admixture with diisocyanates, for example 2:4:6-triisocyanatotoluene, 4:4′:4″-triphenylmethane triisocyanate, 2:4:4′-triisocyanatodiphenyl ether and polymers of tolylene-2:4-diisocyanate.

If desired there may also be included in the reaction mixture a catalyst, for example a tertiary amine, as is the practice in the art, but in general the reactivity of the polyethers containing hydrazine groups is so high that addition of catalyst is neither desirable nor necessary.

The process of the present invention may be used for the manufacture of a wide variety of polyurethane materials which may be rigid or flexible, homogeneous or cellular.

The polyethers of the present invention are particularly useful in the manufacture of foamed polyurethane products by the interaction of the polyether and an organic polyisocyanate in presence of water and/or a low boiling liquid. Foamed polyurethane products made using the polyethers of the present invention may vary from rigid to flexible foams.

Rigid foamed polyurethane products prepared from the polyethers of the present invention are of high load bearing capacity and of high closed cell content.

Flexible foamed polyurethane products prepared from the polyethers of the present invention are of very fine pore size and are very soft and resilient.

Suitable low-boiling point liquids are liquids that are chemically inert towards isocyanates and water and have boiling points not exceeding 75° C., preferably between −40° C. and 50° C., for example fluorinated alkanes such as monofluorotrichloromethane, dibromo-difluoromethane, 1:1:2-trichloro-1:2:2-trifluoroethane, dichlorofluoromethane, dichloromonofluoromethane, dichlorotetrafluoroethane, monochlorodifluromethane and trifluoroethyl bromide or mixtures thereof.

Mixtures of these low boiling liquids one with another and/or with non-fluorine-containing substituted or unsubstituted hydrocarbons, may also be used.

Such liquids are usually employed in amounts of from 1% to 100%, preferably from 5% to 25% by weight of the hydroxylic polymer.

Water is usually employed in amounts of from 1% to 10% by weight of the hydroxyl group-containing polymer, when this is used as the source of carbon dioxide blowing gas.

The polyethers of the present process are especially valuable in the manufacture of polyurethane foams made by the simultaneous interaction of the polyether, an organic polyisocyanate and water and/or a low boiling point liquid.

The process of the present invention is particularly valuable when operated as a one-stage process for the manufacture of polyurethane foams in that the reaction commences within a few seconds of the materials coming into contact and is therefore particularly applicable to the preparation of foamed materials in the form of coatings applied by spraying techniques. Such foam coatings possess good uniform texture and low density.

The invention is illustrated but not limited by the following examples in which the parts are by weight.

*Example 1*

50 parts of the polyether prepared as described below, 1.5 parts of water and 1 part of a polysiloxane-polyoxyalkylene copolymer surfactant are intimately mixed and added to 92 parts of a diphenylmethane diisocyanate composition. After stirring for 20 seconds and pouring into a mould there is obtained a very hard initially slightly friable rigid foam of high closed cell content and good load-bearing capacity.

The diphenylmethane diisocyanate composition used in this example is prepared by phosgenating a crude diaminodiphenylmethane containing about 15% of polyamines (mainly triamines), obtained by condensing formaldehyde with aniline in the presence of hydrochloric acid.

The polyether used above is prepared as follows:

A 5 litre stainless steel reaction vessel equipped with a stirrer, pressure/vacuum gauge, heating/cooling coil and thermocouple is charged with 600 parts of an approximately 40% w./v. aqueous solution of hydrazine and the air in the apparatus is replaced by nitrogen. The temperature is raised to 50° C. and propylene oxide (1800 parts) is added during 2 hours at a pressure rising from 1–28 p.s.i.g. and with the temperature rising during the reaction from 50° C. to a maximum of 100° C.

Vacuum (20 mm. Hg) is applied to the reaction vessel for a period of two hours, the temperature being maintained at 100° C., when there is obtained as a distilled condensate 293 parts of water.

A further 736 parts of propylene oxide is then added at a temperature of 100–106° C. and up to 37 p.s.i.g. pressure when after stirring for one hour and evacuating for 30 minutes at 20 mm. Hg pressure to remove unreacted oxide there is obtained 2655 parts of a very pale straw coloured liquid of viscosity 2.852 cs. and hydroxyl value of 820 mg. KOH/g.

500 parts of the hydrazine derivative are returned to the reaction vessel and a solution of 3 parts of potassium hydroxide in an equal weight of water added. After purging the vessel with nitrogen the temperature is raised to 100° C. and a vacuum of 20 mm. Hg applied for one hour so as to dehydrate. A total of 476 parts of propylene oxide are then added at 100° C. and up to 45 p.s.i.g. during 5½ hours. After heating for 30 minutes at a pressure of 20 mm. Hg to remove unreacted alkylene oxides there is obtained 800 parts of a mobile very pale straw coloured slightly cloudy oil of hydroxyl value 527.1 mg. KOH/g.

*Example 2*

50 parts of the resin of Example 1, 0.25 part of glacial acetic acid, 1 part of a polysiloxane polyoxyalkylene copolymer surfactant and 50 parts of trichloromethane are intimately mixed and added to 67.5 parts of the diphenylmethane diisocyanate composition of Example 1. Foaming occurs immediately to give a very mobile mix which finally solidifies to give a fine textured non-shrinking rigid foam of good appearance and high closed cell content.

When the acetic acid is omitted from the formulation the reaction is so rapid that batch mixing is impossible.

*Example 3*

50 parts of a resin of hydroxyl value 74.3 mg. KOH/g. prepared by the reaction of propylene oxide with an aqueous solution of hydrazine using the technique described in Example 1, 1.5 parts of water, 0.5 part of dibutyl tin dilaurate and 1 part of a siloxane-oxyalkylene copolymer were blended together then mixed rapidly with 20.8 parts of an 80:20 mixture of 2:4- and 2:6-tolylenediisocyanates for about 5 seconds. On pouring into a mould there was rapidly obtained a pale yellow, soft, resilient foam having a low density and satisfactory tear resistance.

What I claim is:

1. A process for the manufacture of polyurethanes by the interaction of an organic polyisocyanate and a hydroxyl group-containing polyether characterised in that the polyether has the general formula—

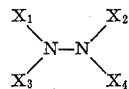

in which $X_1$, $X_2$, $X_3$ and $X_4$ each represent a hydroxypoly(alkyleneoxy)alkyl radical having the general formula—

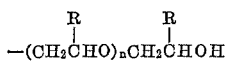

in which $n$ represents an integer and R represents a member of the group consisting of hydrogen and lower alkyl, aryl, halogen-substituted lower alkyl and aryl-substituted lower alkyl radicals, the polyether and the organic polyisocyanate being interacted in the presence of a member of the group consisting of water and liquid fluorinated alkanes which are inert towards isocyanates and water and have boiling points not exceeding 75° C., to form a foam.

2. A process for the manufacture of polyurethanes as set forth in claim 1 wherein $n$ is from 1 to 19.

3. A process for the preparation of cellular polyurethanes which comprises reacting an organic polyisocyanate, and a polyether polyol, in the presence of a blowing agent selected from the group consisting of water and fluoroalkanes said polyether polyol being of the formula—

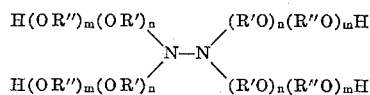

wherein

R' is an alkylene radical of 2–4 carbon atoms,
R" is an alkylene radical of 2–4 carbon atoms,
$m$ is an integer including 0 but not more than 20,
$n$ is a positive integer of from 2–20, the sum of $m+n$ being in the range from 2–20.

References Cited by the Examiner

UNITED STATES PATENTS 2,371,133  3/1945  Graenacher et al. ___ 260—583
2,866,774  12/1958  Price _____ 260—5
2,927,905  3/1960  Eckert _____ 260—77.5

LEON J. BERCOVITZ, *Primary Examiner.*

DONALD E. CZAJA, *Examiner.*

M. C. JACOBS, *Assistant Examiner.*